Feb. 26, 1946.   F. KOCHER   2,395,628
DRILLING AND MILLING DEVICE
Filed March 22, 1943
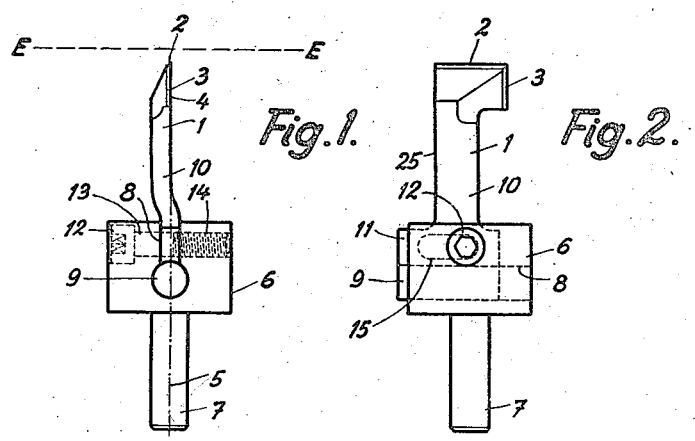
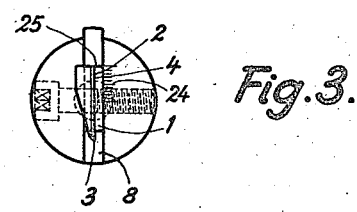
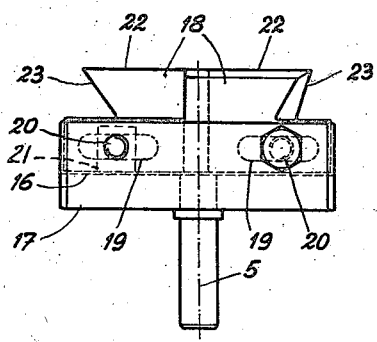
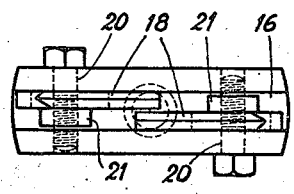
Inventor
F. Kocher
By Glascock Downing v Seebold
Attys.

UNITED STATES PATENT OFFICE 2,395,628

DRILLING AND MILLING DEVICE

Friedrich Kocher, Berne, Switzerland, assignor to Ernst Kocher, Berne, Switzerland Application March 22, 1943, Serial No. 480,086
In Switzerland May 20, 1942

1 Claim. (Cl. 144—219)

Object of the present invention is a drilling and milling device which is characterised by a cutter radially adjustable in the cutter head so that the formation of holes, tenons or slots of different sizes into wood and metal with the same cutter is possible.

The accompanying drawing illustrates, by way of examples, two embodiments of the invention.

Fig. 1 is a side view of the first embodiment,

Fig. 2 is a side view turned by 90° with regard to Fig. 1,

Fig. 3 is a plan view to Fig. 1,

Fig. 4 is a side view of the second embodiment having two cutters, and

Fig. 5 is a plan view to Fig. 4.

The drilling and milling device shown in Figs. 1 to 3 serves for drilling cylindrical holes and for milling slots of rectangular cross section. For this purpose the cutter 1 has two cutting edges 2 and 3 perpendicular to each other, lying in the plane of the surface 4 of the cutter perpendicular to the plane of rotation E—E. As seen in Fig. 1 the axis 5 of the spindle 7 lies in the plane of this surface 4. For receiving the cutter or drill 1, a cutter holder 6 is provided, fixed to the non-illustrated chuck of a drilling, milling or molding machine.

The cutter holder 6 is divided, by the slot 8 having a lower cylindrical portion 9, into two gripping jaws by means of which the cutter 1 is clamped fast in a manner described later on. At the end opposite the cutting edges, the cutter 1 has a lateral extension 11 thicker than the shank 10 (Fig. 2), the cross section of this extension fitting within the slot 8. The lower portion of the extension 11, corresponding to the portion 9, is cylindrical. In this way, the cutter is prevented from being displaced in axial direction. Now, the extension 11 of the cutter 1 can be radially moved in the slot 8 and thereby the diameter of the hole to be drilled or the width of the slot to be milled can be changed. For fixing the cutter in the adjusted radial position, a screw 12 is provided, passing through bores 13, 14 of the jaws of the cutter holder 6, bore 14 being equipped with threads. In order that the screw 12 may pass through the cutter in any position of the same, the cutter is provided with a slot 15.

It is understood that, according to the hole or slot desired, the cutting edges 2 and 3 may have any suitable shape and position other than shown in the drawing.

A very efficient device for molding or milling dovetailed slots or grooves is shown in Figs. 4 and 5. Here, the slot 16 of the cutter holder 17 is large enough to receive two drills or cutters 18 radially displaceable with regard to each other. Each of the cutters 18 has a slot 19 through which the fixing screws 20 pass. The latter engage nuts 21 for clamping the cutter 18 fast. In order to prevent a turning of these nuts when rotating the screws 20, they are preferably square-shaped with one side face in contact with the bottom of the slot 16 as shown in dotted lines in Figure 4. Each of the cutters 18 has two cutting edges 22, 23; edge 23 forming an acute angle with edge 22 lying perpendicular to the spindle axis 5. The plane through the edges 22, 23 of the one cutter is parallel to the plane through the edges of the other cutter. It is understood that the cutting edges 22, 23 might have any other shape and position than those shown in Figs. 4 and 5.

The cutter holder 6 can be provided with a scale 24 for giving the cutter the radial position desired by bringing the face 25 of the cutter in alignment with one of the marks of the scale 24.

What I claim is:

A drilling and milling device comprising an integral holder having a channel therein, a supporting spindle carried by said holder, two cutters having flat portions thinner than the width of said channel to provide a space between said portions and a wall of said channel and slots disposed in said portions perpendicularly to the axis of said spindle, and means carried by said holder and engaging in said slots for securing the cutters against the opposed side walls of said channel, the securing means for each cutter including a threaded bolt mounted in said holder and a nut fitted on said bolt and engaging the related cutter and accommodated in said space.

FRIEDRICH KOCHER.